United States Patent

Ichikawa et al.

(10) Patent No.: US 10,234,865 B2
(45) Date of Patent: Mar. 19, 2019

(54) CONTROL DEVICE, PROCESSING APPARATUS SYSTEM, AND RECORDING MEDIUM

(71) Applicant: FUJI XEROX CO., LTD., Tokyo (JP)

(72) Inventors: Akira Ichikawa, Yokohama (JP); Hajime Kajiyama, Yokohama (JP); Hideki Fujimoto, Yokohama (JP); Kunitoshi Yamamoto, Yokohama (JP); Mariko Miyazaki, Yokohama (JP); Naoya Ogata, Yokohama (JP); Tetsuya Kobayashi, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/369,456

(22) Filed: Dec. 5, 2016

(65) Prior Publication Data

US 2017/0364085 A1 Dec. 21, 2017

(30) Foreign Application Priority Data

Jun. 21, 2016 (JP) .................................. 2016-122755

(51) Int. Cl.
- *G06K 3/00* (2006.01)
- *G05D 1/02* (2006.01)
- *G06K 15/02* (2006.01)
- *G06F 3/12* (2006.01)

(52) U.S. Cl.
CPC ......... *G05D 1/0225* (2013.01); *G05D 1/0217* (2013.01); *G06F 3/126* (2013.01); *G06F 3/1212* (2013.01); *G06F 3/1285* (2013.01); *G06K 15/1823* (2013.01); *G05D 2201/0211* (2013.01); *G06K 2215/0082* (2013.01)

(58) Field of Classification Search
CPC ...... G05D 1/00; G05D 1/0225; G05D 1/0217; G06F 3/00; G06F 3/1212; G06F 3/126; G06F 3/1285; G06K 15/00; G06K 15/1823; G06K 3/00
See application file for complete search history.

(56) References Cited

U.S. PATENT DOCUMENTS

| | | | |
|---|---|---|---|
| 9,117,182 B2 * | 8/2015 | Bapna | G06Q 10/025 |
| 9,536,424 B2 * | 1/2017 | Macfarlane | G08G 1/0129 |
| 9,677,900 B2 * | 6/2017 | Yeo | G01C 21/3641 |
| 2009/0177376 A1 * | 7/2009 | Mo | G01C 21/20 701/533 |
| 2013/0179067 A1 * | 7/2013 | Trowbridge | G01C 21/3484 701/410 |

(Continued)

FOREIGN PATENT DOCUMENTS

JP 2001-125646 A 5/2001

OTHER PUBLICATIONS

Jun. 1, 2017 Seach Report issued in European Patent Application No. 16202850.0.

Primary Examiner — Yonel Beaulieu
(74) Attorney, Agent, or Firm — Oliff PLC

(57) ABSTRACT

A control device includes: a receiving unit that receives a request for processing; and a control unit that, in a case where the receiving unit receives a plurality of requests for processing from a plurality of places, controls a traveling route of a processing apparatus based on traveling time taken for the processing apparatus to travel to the plurality of places and processing time taken for the processing apparatus to finish the processing after traveling.

6 Claims, 16 Drawing Sheets

(56) References Cited

U.S. PATENT DOCUMENTS

| | | | |
|---|---|---|---|
| 2014/0172292 A1* | 6/2014 | McGee | G01C 21/3605 701/418 |
| 2014/0229102 A1* | 8/2014 | Bapna | G06Q 10/025 701/491 |
| 2015/0073620 A1* | 3/2015 | Matsumura | B60W 30/143 701/1 |
| 2015/0094928 A1* | 4/2015 | Matsumura | B60W 30/143 701/93 |
| 2015/0198449 A1* | 7/2015 | Okude | G01C 21/3492 701/408 |
| 2015/0228188 A1* | 8/2015 | Macfarlane | G08G 1/0129 340/936 |
| 2015/0378652 A1 | 12/2015 | Sakurai | |
| 2016/0047661 A1* | 2/2016 | Yeo | G01C 21/3641 701/430 |
| 2016/0059871 A1* | 3/2016 | Koumoto | E01B 25/12 104/130.01 |

* cited by examiner

FIG. 6

CASE WHERE EACH TRAVELING TIME << EACH PRINTING TIME

| | From | To | EACH TRAVELING TIME | EACH PRINTING TIME | EACH WAIT TIME | AVERAGE WAIT TIME |
|---|---|---|---|---|---|---|
| CASE WHERE IMAGE FORMING APPARATUS TRAVELS IN CLOCKWISE DIRECTION | Home | A | 1 | 10 | 1 | |
| | A | B | 1 | 20 | 12 | |
| | B | C | 1 | 30 | 33 | |
| | C | D | 1 | 40 | 64 | 27.5 SHORT |
| | D | (A→) Home | 2 | | 106 | |
| CASE WHERE IMAGE FORMING APPARATUS TRAVELS IN COUNTERCLOCKWISE DIRECTION | From | To | EACH TRAVELING TIME | EACH PRINTING TIME | EACH WAIT TIME | AVERAGE WAIT TIME |
| | Home | A | 1 | 10 | 1 | |
| | A | D | 1 | 40 | 12 | |
| | D | C | 1 | 30 | 53 | |
| | C | B | 1 | 20 | 84 | 37.5 LONG |
| | B | (A→) Home | 2 | | 106 | |

FIG. 7

CASE WHERE EACH TRAVELING TIME >> EACH PRINTING TIME

| | From | To | EACH TRAVELING TIME | EACH PRINTING TIME | EACH WAIT TIME | AVERAGE WAIT TIME |
|---|---|---|---|---|---|---|
| CASE WHERE IMAGE FORMING APPARATUS TRAVELS IN CLOCKWISE DIRECTION | Home | A | 10 | 1 | 10 | |
| | A | B | 10 | 2 | 21 | |
| | B | C | 10 | 3 | 33 | 27.5 SUBSTANTIALLY SAME |
| | C | D | 10 | 4 | 46 | |
| | D | (A→) Home | 20 | | 70 | |
| CASE WHERE IMAGE FORMING APPARATUS TRAVELS IN COUNTER-CLOCKWISE DIRECTION | From | To | EACH TRAVELING TIME | EACH PRINTING TIME | EACH WAIT TIME | AVERAGE WAIT TIME |
| | Home | A | 10 | 1 | 10 | |
| | A | D | 10 | 4 | 21 | |
| | D | C | 10 | 3 | 35 | 28.5 SUBSTANTIALLY SAME |
| | C | B | 10 | 2 | 48 | |
| | B | (A→) Home | 20 | | 70 | |

FIG. 8

CASE WHERE EACH TRAVELING TIME ≈ EACH PRINTING TIME

| | From | To | EACH TRAVELING TIME | EACH PRINTING TIME | EACH WAIT TIME | AVERAGE WAIT TIME |
|---|---|---|---|---|---|---|
| CASE WHERE IMAGE FORMING APPARATUS TRAVELS IN CLOCK-WISE DIRECTION | Home | A | 10 | 10 | 10 | |
| | A | B | 10 | 20 | 30 | |
| | B | C | 10 | 30 | 60 | 50 SHORT |
| | C | D | 10 | 40 | 100 | |
| | D | (A→) Home | 20 | | 160 | |
| CASE WHERE IMAGE FORMING APPARATUS TRAVELS IN COUNTER-CLOCKWISE DIRECTION | | | EACH TRAVELING TIME | EACH PRINTING TIME | EACH WAIT TIME | AVERAGE WAIT TIME |
| | Home | A | 10 | 10 | 10 | |
| | A | D | 10 | 40 | 30 | |
| | D | C | 10 | 30 | 80 | 60 LONG |
| | C | B | 10 | 20 | 120 | |
| | B | (A→) Home | 20 | | 160 | |

FIG. 10

CASE WHERE EACH TRAVELING TIME << EACH PRINTING TIME

| | From | To | EACH TRAVELING TIME | EACH PRINTING TIME | EACH WAIT TIME | AVERAGE WAIT TIME |
|---|---|---|---|---|---|---|
| CASE WHERE IMAGE FORMING APPARATUS TRAVELS IN CLOCK-WISE DIRECTION | Home | A | 1 | 10 | 1 | |
| | A | B | 2 | 20 | 13 | |
| | B | C | 4 | 30 | 37 | 29.8 SHORT |
| | C | D | 1 | 40 | 68 | |
| | D | (A→) Home | 4 | | 112 | |
| | From | To | EACH TRAVELING TIME | EACH PRINTING TIME | EACH WAIT TIME | AVERAGE WAIT TIME |
| CASE WHERE IMAGE FORMING APPARATUS TRAVELS IN COUNTER-CLOCKWISE DIRECTION | Home | A | 1 | 10 | 1 | |
| | A | D | 3 | 40 | 14 | |
| | D | C | 1 | 30 | 55 | 39.8 LONG |
| | C | B | 4 | 20 | 89 | |
| | B | (A→) Home | 3 | | 112 | |

FIG. 11

CASE WHERE EACH TRAVELING TIME >> EACH PRINTING TIME

| | From | To | EACH TRAVELING TIME | EACH PRINTING TIME | EACH WAIT TIME | AVERAGE WAIT TIME |
|---|---|---|---|---|---|---|
| CASE WHERE IMAGE FORMING APPARATUS TRAVELS IN CLOCKWISE DIRECTION | Home | A | 10 | | 10 | |
| | A | B | 20 | 1 | 31 | |
| | B | C | 40 | 2 | 73 | |
| | C | D | 10 | 3 | 86 | 500 SUBSTANTIALLY SAME |
| | D | (A→) Home | 40 | 4 | 130 | |
| CASE WHERE IMAGE FORMING APPARATUS TRAVELS IN COUNTER-CLOCKWISE DIRECTION | Home | A | 10 | | 10 | |
| | A | D | 30 | 1 | 41 | |
| | D | C | 10 | 4 | 55 | |
| | C | B | 40 | 3 | 98 | 510.0 SUBSTANTIALLY SAME |
| | B | (A→) Home | 30 | 2 | 130 | |

FIG. 12

CASE WHERE EACH TRAVELING TIME ≈ EACH PRINTING TIME

| | From | To | EACH TRAVELING TIME | EACH PRINTING TIME | EACH WAIT TIME | AVERAGE WAIT TIME |
|---|---|---|---|---|---|---|
| CASE WHERE IMAGE FORMING APPARATUS TRAVELS IN CLOCK-WISE DIRECTION | Home | A | 10 | 10 | 10 | |
| | A | B | 20 | 20 | 40 | |
| | B | C | 40 | 30 | 100 | 72.5 SHORT |
| | C | D | 10 | 40 | 140 | |
| | D | (A→) Home | 40 | | 220 | |
| | From | To | EACH TRAVELING TIME | EACH PRINTING TIME | EACH WAIT TIME | AVERAGE WAIT TIME |
| CASE WHERE IMAGE FORMING APPARATUS TRAVELS IN COUNTER-CLOCKWISE DIRECTION | Home | A | 10 | 10 | 10 | |
| | A | D | 30 | 40 | 50 | |
| | D | C | 10 | 30 | 100 | 82.5 LONG |
| | C | B | 40 | 20 | 170 | |
| | B | (A→) Home | 30 | | 220 | |

FIG. 14

CASE WHERE EACH TRAVELING TIME << EACH PRINTING TIME

| | From | To | EACH TRAVELING TIME | EACH PRINTING TIME | EACH WAIT TIME | AVERAGE WAIT TIME |
|---|---|---|---|---|---|---|
| CASE WHERE IMAGE FORMING APPARATUS TRAVELS IN CLOCK-WISE DIRECTION | Home | A | 1 | 10 | 1 | |
| | A | B | 2 | 20 | 13 | |
| | B | C | 10 | 30 | 43 | 32.8 SHORT |
| | C | D | 1 | 40 | 74 | |
| | D | (A→) Home | 4 | | 118 | |
| CASE WHERE IMAGE FORMING APPARATUS TRAVELS IN COUNTER-CLOCKWISE DIRECTION | From | To | EACH TRAVELING TIME | EACH PRINTING TIME | EACH WAIT TIME | AVERAGE WAIT TIME |
| | Home | A | 1 | 10 | 1 | |
| | A | D | 3 | 40 | 14 | |
| | D | C | 1 | 30 | 55 | 41.3 LONG |
| | C | B | 10 | 20 | 95 | |
| | B | (A→) Home | 3 | | 118 | |

FIG. 15

CASE WHERE EACH TRAVELING TIME >> EACH PRINTING TIME

| | From | To | EACH TRAVELING TIME | EACH PRINTING TIME | EACH WAIT TIME | AVERAGE WAIT TIME |
|---|---|---|---|---|---|---|
| CASE WHERE IMAGE FORMING APPARATUS TRAVELS IN CLOCK-WISE DIRECTION | Home | A | 10 | 1 | 10 | |
| | A | B | 20 | 2 | 31 | |
| | B | C | 100 | 3 | 133 | 80.0 SHORT |
| | C | D | 10 | 4 | 146 | |
| | D | (A→)Home | 40 | | 190 | |
| | From | To | EACH TRAVELING TIME | EACH PRINTING TIME | EACH WAIT TIME | AVERAGE WAIT TIME |
| CASE WHERE IMAGE FORMING APPARATUS TRAVELS IN COUNTER-CLOCKWISE DIRECTION | Home | A | 10 | 1 | 10 | |
| | A | D | 30 | 4 | 41 | |
| | D | C | 10 | 3 | 55 | 66.0 LONG |
| | C | B | 100 | 2 | 158 | |
| | B | (A→)Home | 30 | | 190 | |

FIG. 16

CASE WHERE EACH TRAVELING TIME ≈ EACH PRINTING TIME

| | From | To | EACH TRAVELING TIME | EACH PRINTING TIME | EACH WAIT TIME | AVERAGE WAIT TIME |
|---|---|---|---|---|---|---|
| CASE WHERE IMAGE FORMING APPARATUS TRAVELS IN CLOCKWISE DIRECTION | Home | A | 10 | 10 | 10 | |
| | A | B | 20 | 20 | 40 | |
| | B | C | 100 | 30 | 160 | 102.5 LONG |
| | C | D | 10 | 40 | 200 | |
| | D | (A→) Home | 40 | | 280 | |
| | From | To | EACH TRAVELING TIME | EACH PRINTING TIME | EACH WAIT TIME | AVERAGE WAIT TIME |
| CASE WHERE IMAGE FORMING APPARATUS TRAVELS IN COUNTER-CLOCKWISE DIRECTION | Home | A | 10 | 10 | 10 | |
| | A | D | 30 | 40 | 50 | |
| | D | C | 10 | 30 | 100 | 97.5 SHORT |
| | C | B | 100 | 20 | 230 | |
| | B | (A→) Home | 30 | | 280 | |

CONTROL DEVICE, PROCESSING APPARATUS SYSTEM, AND RECORDING MEDIUM

CROSS-REFERENCE TO RELATED APPLICATIONS

This application is based on and claims priority under USC 119 from Japanese Patent Application No. 2016-122755, filed on Jun. 21, 2016.

BACKGROUND

Technical Field

The present invention relates to a control device, a processing apparatus system, and a recording medium.

SUMMARY

According to an aspect of the invention, there is provided a control device including: a receiving unit that receives a request for processing; and a control unit that, in a case where the receiving unit receives a plurality of requests for processing from a plurality of places, controls a traveling route of a processing apparatus based on traveling time taken for the processing apparatus to travel to the plurality of places and processing time taken for the processing apparatus to finish the processing after traveling.

BRIEF DESCRIPTION OF THE DRAWINGS

Exemplary embodiment(s) of the present invention will be described in detail based on the following figures, wherein:

FIG. 6 is a table for calculating an average wait time in a case where each traveling time<< each printing time in the route in FIG. 5.

FIG. 7 is a table for calculating an average wait time in a case where each traveling t time>> each printing time in the route in FIG. 5;

FIG. 8 is a table for calculating an average wait time in a case where each traveling time≈each printing time in the route in FIG. 5;

FIG. 10 is a table for calculating an average wait time in a case where each traveling time<< each printing time in the route in FIG. 9;

FIG. 11 is a table for calculating an average wait time in a case where each traveling time>> each printing time in the route in FIG. 9;

FIG. 12 is a table for calculating an average wait time in a case where each traveling time≈each printing time in the route in FIG. 9;

FIG. 14 is a table for calculating an average wait time in a case where each traveling time<< each printing time in the route in FIG. 13;

FIG. 15 is a table for calculating an average wait time in a case where each traveling time>> each printing time in the route in FIG. 13; and FIG. 16 is a table for calculating an average wait time in a case where each traveling time≈each printing time in the route in FIG. 13.

DETAILED DESCRIPTION

Next, an exemplary embodiment of the present invention will be described with reference to the drawings.

Figure 1:
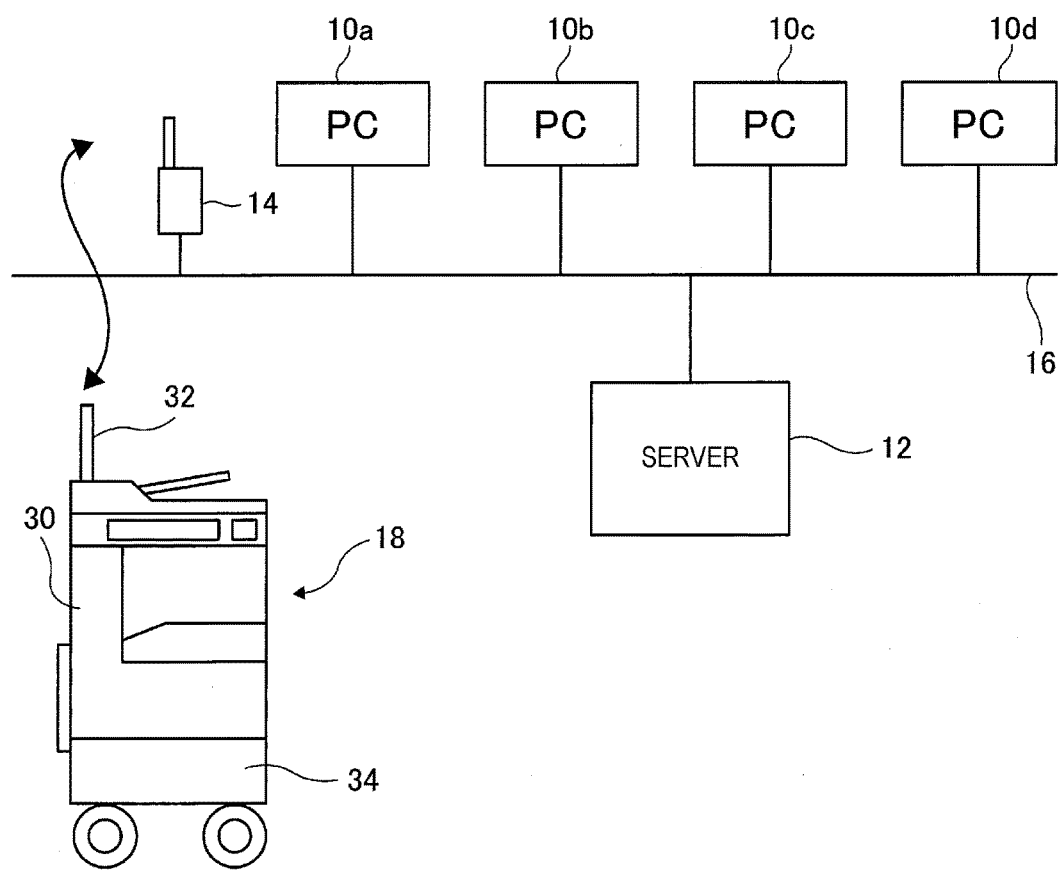
FIG. 1 is a system diagram illustrating a configuration of a processing apparatus system according to an exemplary embodiment of the present invention.

FIG. 1 is a system diagram illustrating a configuration of a processing apparatus system according to an exemplary embodiment of the present invention.

In a processing apparatus system according to the exemplary embodiment of the present invention, four personal computers 10a to 10d, a server 12, and a wireless LAN terminal 14 are connected to each other via a network 16, for example. In addition, a mobile image forming apparatus 18 transmits and receives printing data and the like to and from the wireless LAN terminal 14.

The personal computers 10a to 10d transmit printing data created by each user to the server 12.

Figure 2:
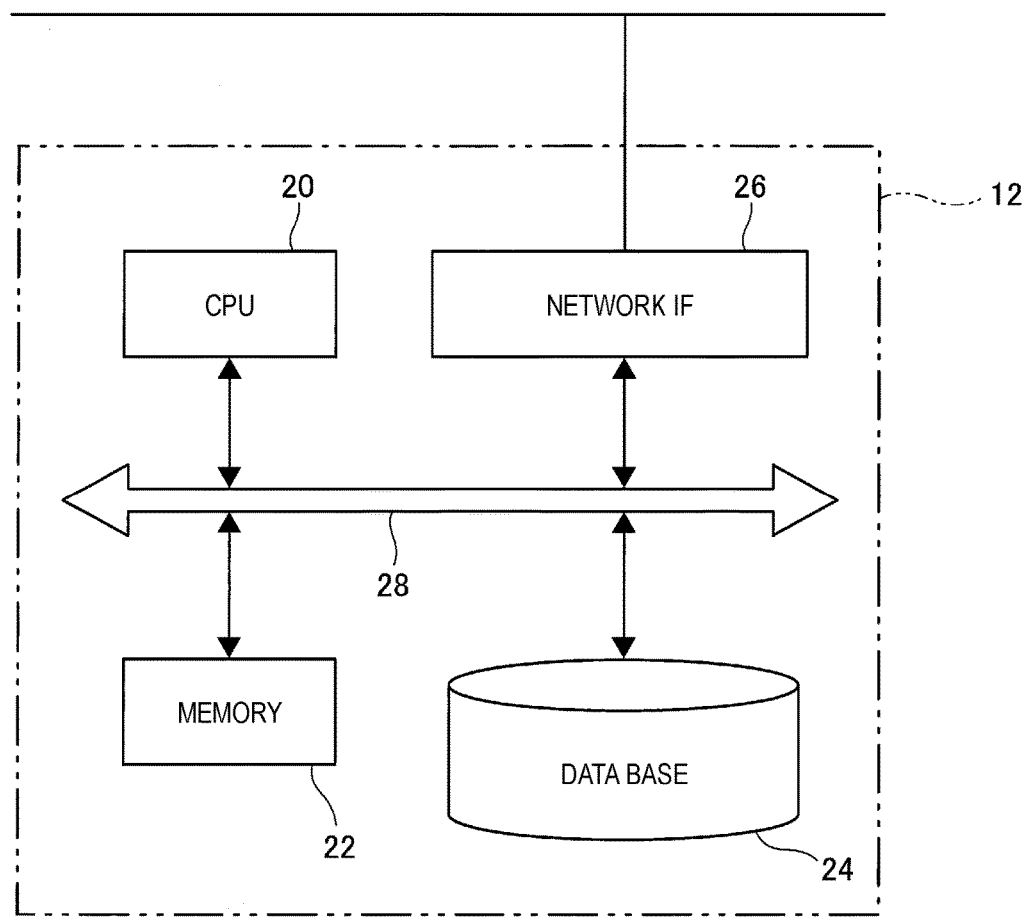
FIG. 2 is a block diagram illustrating a hardware configuration of a server according to the exemplary embodiment of the present invention.

As illustrated in FIG. 2, the server 12 includes a CPU 20, a memory 22, a data base 24, and a network interface 26 which are connected to each other via a control bus 28. The CPU 20 executes predetermined processing on the basis of a control program stored in the memory 22 to control an operation of the server 12. The memory 22 stores the control program and printing data which will be described later. In addition, the data base 24 stores past printing records or the like of each user of the personal computers 10a to 10d. In addition, a map indicating an installation place of an office or the like in which the personal computers 10a to 10d are installed and installation positions of the personal computers 10a to 10d are stored in the data base 24 of the server 12.

In the exemplary embodiment, the server 12 is connected to the personal computers 10a to 10d via the wired network 16. However, the server 12 may be connected to the personal computers 10a to 10d via a wireless LAN and the server 12 may be connected to the personal computers 10a to 10d via the internet using cloud computing.

The image forming apparatus 18 includes a main body portion 30, a wireless communication unit 32, and a mobile device 34. The main body portion 30 prints printing data received by the wireless communication unit 32 on a paper sheet using a portion for image forming. In the exemplary embodiment, the mobile device 34 makes the image forming apparatus 18 travel when receiving a traveling command from the server 12.

Figure 3:
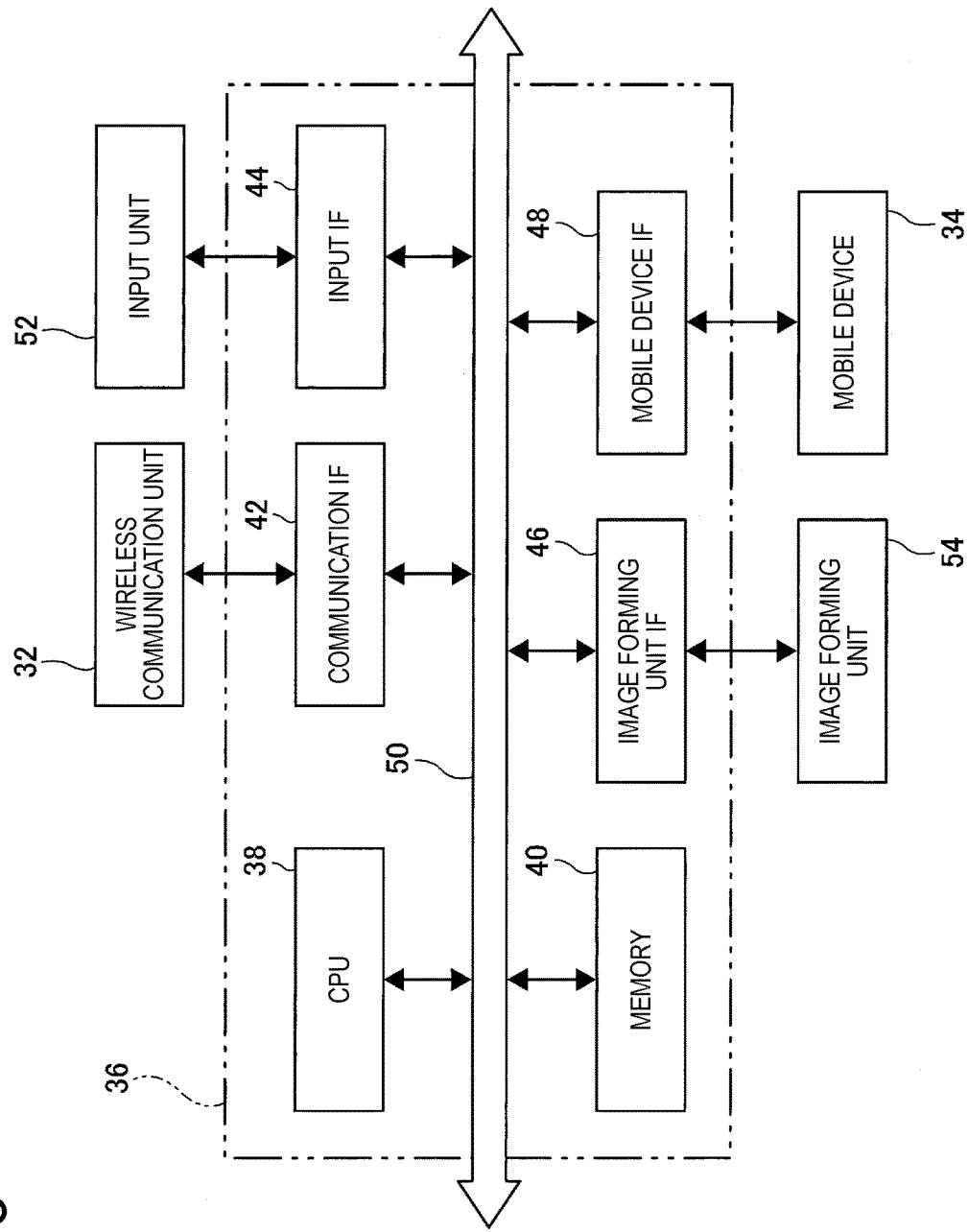
FIG. 3 is a block diagram illustrating a hardware configuration of an image forming apparatus according to the exemplary embodiment of the present invention.

FIG. 3 is a block diagram illustrating a control unit of the image forming apparatus 18.

A control unit 36 includes a CPU 38, a memory 40, a communication interface 42, an input interface 44, an image forming unit interface 46, and a mobile device interface 48 which are connected to each other via a control bus 50.

The CPU 38 executes predetermined processing on the basis of a control program stored in the memory 40. The communication interface 42 is connected to the wireless communication unit 32 and performs data communication via the wireless communication unit 32. The input interface 44 is connected to an input unit 52 and receives input information from the input unit 52. The input unit 52 includes an ID input portion to which an ID of a user is input using an IC card, for example. The image forming unit interface 46 is connected to an image forming unit 54, and the image forming unit 54 forms an image on a recording medium. The mobile device interface 48 is connected to the mobile device 34. When the CPU 38 receives a traveling command from the above-described server 12, the mobile device 34 is controlled on the basis of the traveling command.

Figure 4:
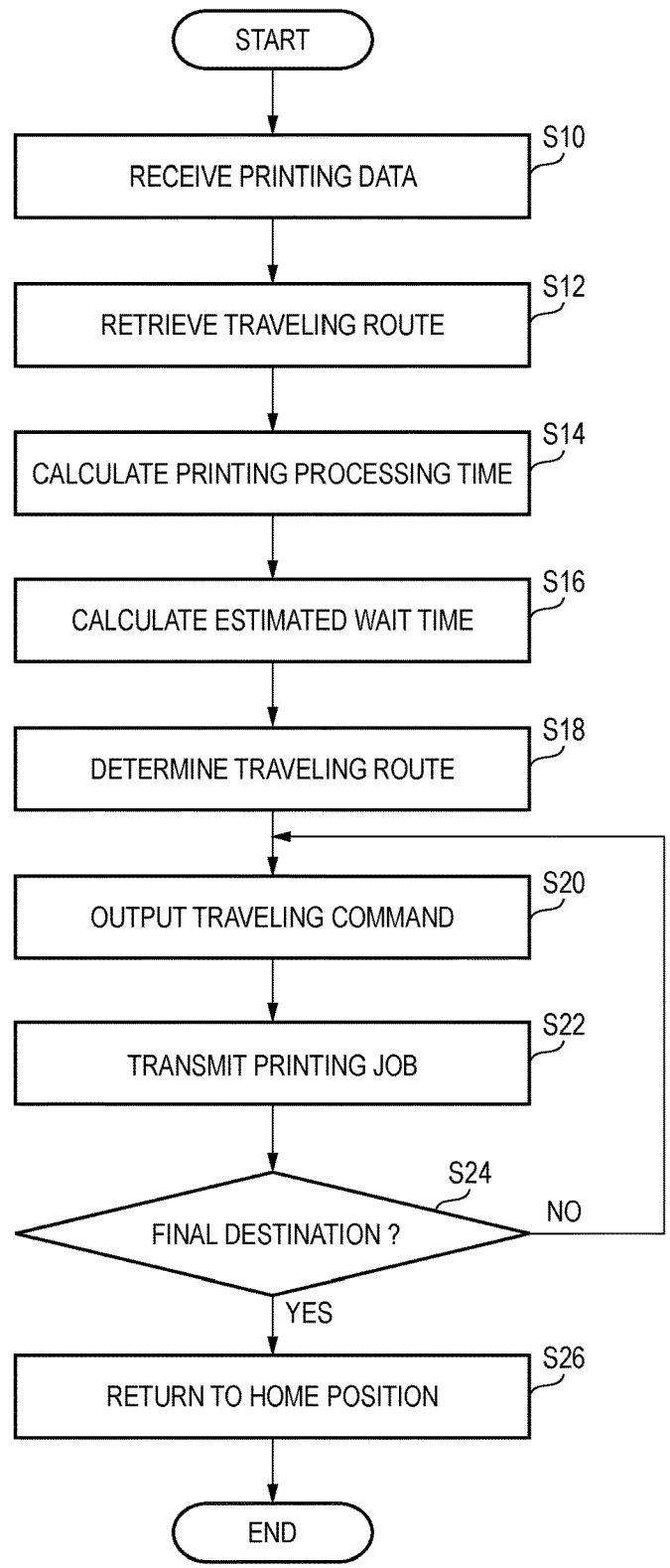
FIG. 4 is a flowchart illustrating a control flow of a server according to the exemplary embodiment of the present invention.

FIG. 4 is a flowchart illustrating a control flow of the server 12.

First, in Step S10, the server 12 receives printing data from the plural personal computers 10a to 10d. The printing data includes a printing job, IDs of users using the personal computers 10a to 10d, and printing setting information (color-monochrome, type and size of paper sheet, dual side printing-single side printing, printing quality, multiple page printing (2 in 1 printing or the like), type of post processing, or the like). When there are plural items of printing data, the printing jobs are stored in the memory 22 as a job queue in order of reception time.

Next, in Step S12, the personal computers 10a to 10d which transmit the printing jobs are specified from the IDs of the users using the personal computers 10a to 10d and plural candidate routes along which the image forming apparatus 18 can travel are retrieved on the basis of the map indicating the installation places of the personal computers 10a to 10d and the installation positions.

Next, in Step S14, an estimated printing processing time of the image forming apparatus 18 is calculated. The estimated printing processing time is calculated from the number of printing jobs, the number of pages in an item of printed matter, a type of printing processing (color-monochrome, type and size of paper sheet, dual side printing-single side printing, printing quality, multiple page printing (2 in 1 printing or the like), type of post processing, or the like), and respective past printing records of users of the personal computers 10a to 10d stored in the data base 24.

Next, in Step S16, an estimated wait times is calculated applying the estimated printing processing time to the candidate routes retrieved in Step S12.

An Nth estimated wait time is calculated as follows.

$$\text{Estimated wait time for } N\text{th user} = \text{wait time for } (N-1)\text{th user} + (N-1)\text{th estimated printing time} + \text{traveling time from } (N-1)\text{th user} \quad (1)$$

That is, each estimated wait time is a time from the start of traveling of the image forming apparatus 18 to the start of printing in each place.

Next, in Step S18, an average estimated wait time is calculated by applying the estimated wait time calculated in Step S16 to each of the plural candidate routes retrieved in Step S12, and a route with the shortest average wait time is determined as the traveling route.

Next, in Step S20, traveling commands are successively output to the image forming apparatus 18 so that the image forming apparatus 18 travels along the traveling route determined in Step S18.

Next, in Step S22, printing jobs to be printed at respective places are transmitted to the image forming apparatus 18.

When the traveling route is determined in Step S20, a printing job queue is switched according to the traveling route.

Next, in Step S24, it is determined whether the place where the image forming apparatus 18 is made to travel is the final destination. When it is determined that it is not the final destination, the processing returns to Step S20 and the traveling command is transmitted so that the image forming apparatus 18 travels to the next place. When it is determined that the place where the image forming apparatus 18 is made to travel is the final destination in Step S24, the processing proceeds to Step S26 and the image forming apparatus 18 returns to the home position. Thereafter, the processing ends.

In the exemplary embodiment, the image forming apparatus 18 travels to the installation places of the personal computers 10a to 10d. However, the destination of the image forming apparatus 18 is not limited to this. For example, the image forming apparatus 18 may travel to a place specified by the user or the position of a location transmitter, the location transmitter being carried by the user.

In a case where the traveling route is determined, wait time until the image forming apparatus 18 travels to the installation places of the personal computers 10a to 10d or the time at which the image forming apparatus 18 travels to the installation places of the personal computers 10a to 10d may be displayed or reported by the means of the personal computers 10a to 10d or other means.

A further specific example will be described.

Figure 5:
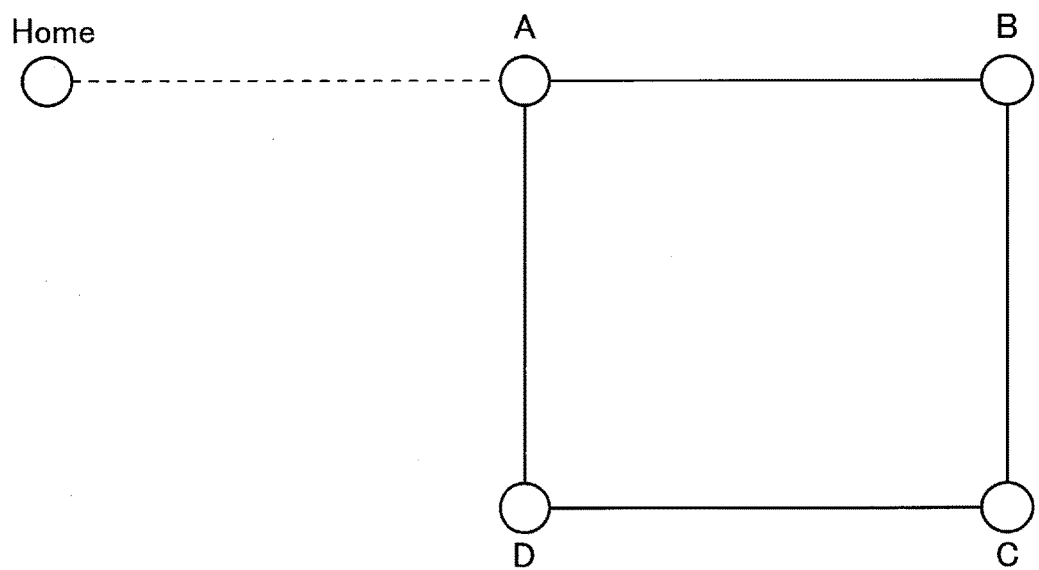
FIG. 5 is a route diagram illustrating a route in a case where traveling times between places for processing are the same.

FIG. 5 illustrates a route in a case where traveling time between the place A and a place B, traveling time between the place B and a place C, traveling time between the place C and a place D, and traveling time between the place D and the place A are the same.

FIG. 6 is related to a case where each traveling time<< each printing time in the route in FIG. 5.

That is, it is assumed that traveling time from the home position to the place A is 1 minute and traveling time between the place A and a place B, traveling time between the place B and a place C, traveling time between the place C and a place D, and traveling time between the place D and the place A are 1 minute. In addition, it is also assumed that the estimated printing time for the place A is 10 minutes, the estimated printing time for the place B is 20 minutes, the estimated printing time for the place C is 30 minutes, and the estimated printing time for the place D is 40 minutes. In this case, when it is assumed that the image forming apparatus 18 travels in the clockwise direction, the wait time for the place A is 1 minute, the wait time for the place B is 12 minutes, the wait time for the place C is 33 minutes, and the wait time for the place D is 64 minutes. Accordingly, the average wait time is 27.5 minutes.

On the other hand, in a case where the image forming apparatus 18 travels in the counterclockwise direction, the wait time for the place A is 1 minute, the wait time for the place D is 12 minutes, the wait time for the place C is 53 minutes, and the wait time for the place B is 84 minutes. Accordingly, the average wait time is 37.5 minutes. Therefore, since the average wait time becomes shorter when the image forming apparatus 18 travels in the clockwise direction, the traveling route in the clockwise direction is selected.

FIG. 7 is related to a case where each traveling time>> each printing time in the route in FIG. 5.

That is, it is assumed that traveling time from the home position to the place A is 10 minutes and traveling time between the place A and the place B, traveling time between the place B and the place C, traveling time between the place C and the place D, and traveling time between the place D and the place A are 10 minutes. In addition, it is also assumed that the estimated printing time for the place A is 1 minute, the estimated printing time for the place B is 2 minutes, the estimated printing time for the place C is 3 minutes, and the estimated printing time for the place D is 4 minutes. In this case, when it is assumed that the image forming apparatus 18 travels in the clockwise direction, the wait time for the place A is 10 minutes, the wait time for the place B is 21 minutes, the wait time for the place C is 33 minutes, and the wait time for the place D is 46 minutes. Accordingly, the average wait time is 27.5 minutes.

On the other hand, in a case where the image forming apparatus 18 travels in the counterclockwise direction, the wait time for the place A is 10 minutes, the wait time for the place D is 21 minutes, the wait time for the place C is 35 minutes, and the wait time for the place B is 48 minutes. Accordingly, the average wait time is 28.5 minutes. Therefore, since the average wait time in a case where the image forming apparatus 18 travels in the clockwise direction and the average wait time in a case where the image forming apparatus 18 travels in the counterclockwise direction are the substantially same, any one of the traveling routes is selected.

FIG. 8 is related to a case where each traveling time≈each printing time in the route in FIG. 5.

That is, it is assumed that traveling time from the home position to the place A is 10 minutes and traveling time between the place A and the place B, traveling time between the place B and the place C, traveling time between the place C and the place D, and traveling time between the place D and the place A are 10 minutes. In addition, it is also assumed that the estimated printing time for the place A is 10 minutes, the estimated printing time for the place B is 20 minutes, the estimated printing time for the place C is 30 minutes, and the estimated printing time for the place D is 40 minutes. In this case, when it is assumed that the image forming apparatus 18 travels in the clockwise direction, the wait time for the place A is 10 minutes, the wait time for the place B is 30 minutes, the wait time for the place C is 60 minutes, and the wait time for the place D is 100 minutes. Accordingly, the average wait time is 50 minutes.

On the other hand, in a case where the image forming apparatus 18 travels in the counterclockwise direction, the wait time for the place A is 10 minutes, the wait time for the place D is 30 minutes, the wait time for the place C is 80 minutes, and the wait time for the place B is 120 minutes. Accordingly, the average wait time is 60 minutes. Therefore, since the average wait time becomes shorter when the image forming apparatus 18 travels in the clockwise direction, the traveling route in the clockwise direction is selected.

Figure 9:
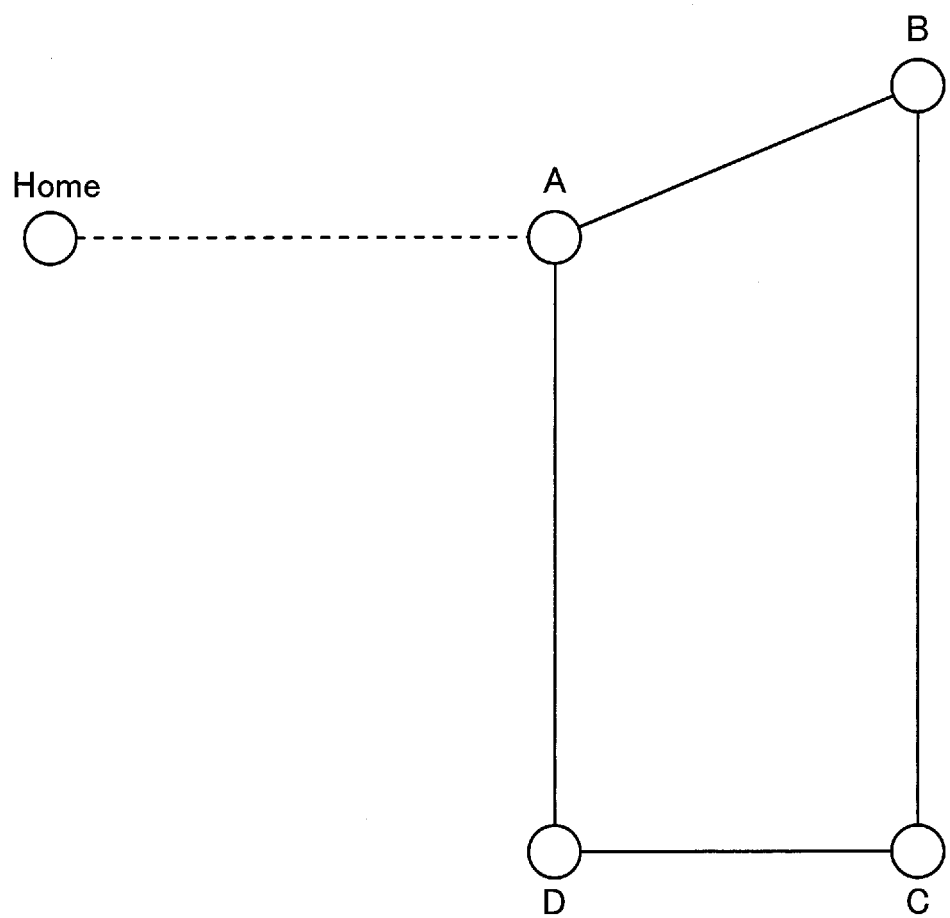
FIG. 9 is a route diagram illustrating a route in a case where traveling times between places for processing are different.

FIG. 9 illustrates a case where traveling times of the image forming apparatus 18 are different.

FIG. 10 is related to a case where each traveling time<< each printing time in the route in FIG. 9.

That is, it is assumed that traveling time from the home position to the place A is 1 minute and it is also assumed that traveling time between the place A and the place B is 2 minutes, traveling time between the place B and the place C is 4 minutes, traveling time between the place C and the place D is 1 minute, and traveling time between the place D and the place A are 4 minutes in a case where the image forming apparatus 18 travels in the clockwise direction. In addition, it is also assumed that the estimated printing time for the place A is 10 minutes, the estimated printing time for the place B is 20 minutes, the estimated printing time for the place C is 30 minutes, and the estimated printing time for the place D is 40 minutes. In this case, when it is assumed that the image forming apparatus 18 travels in the clockwise direction, the wait time for the place A is 1 minute, the wait time for the place B is 13 minutes, the wait time for the place C is 37 minutes, and the wait time for the place D is 68 minutes. Accordingly, the average wait time is 29.8 minutes.

On the other hand, it is assumed that traveling time between the place A and the place D is 3 minutes, traveling time between the place D and the place C is 1 minute, traveling time between the place C and the place B is 4 minutes, and traveling time between the place B and the place A are 3 minutes in a case where the image forming apparatus 18 travels in the counterclockwise direction. In a case where the image forming apparatus 18 travels in the counterclockwise direction, the wait time for the place A is 1 minute, the wait time for the place D is 14 minutes, the wait time for the place C is 55 minutes, and the wait time for the place B is 89 minutes. Accordingly, the average wait time is 39.8 minutes. Therefore, since the average wait time becomes shorter when the image forming apparatus 18 travels in the clockwise direction, the traveling route in the clockwise direction is selected.

FIG. 11 is related to a case where each traveling time>> each printing time in the route in FIG. 9.

That is, it is assumed that traveling time from the home position to the place A is 10 minutes and it is also assumed that traveling time between the place A and the place B is 20 minutes, traveling time between the place B and the place C is 40 minutes, and traveling time between the place C and the place D is 10 minutes. In addition, it is also assumed that the estimated printing time for the place A is 1 minute, the estimated printing time for the place B is 2 minutes, the estimated printing time for the place C is 3 minutes, and the estimated printing time for the place D is 4 minutes. In this case, when it is assumed that the image forming apparatus 18 travels in the clockwise direction, the wait time for the place A is 10 minutes, the wait time for the place B is 31 minutes, the wait time for the place C is 73 minutes, and the wait time for the place D is 86 minutes. Accordingly, the average wait time is 50.0 minutes.

On the other hand, in a case where the image forming apparatus 18 travels in the counterclockwise direction, the wait time for the place A is 10 minutes, the wait time for the place D is 41 minutes, the wait time for the place C is 55 minutes, and the wait time for the place B is 98 minutes. Accordingly, the average wait time is 51.0 minutes. Therefore, since the average wait time in a case where the image forming apparatus 18 travels in the clockwise direction and the average wait time in a case where the image forming apparatus 18 travels in the counterclockwise direction are the substantially same, any one of the traveling routes is selected.

FIG. 12 is related to a case where each traveling time≈each printing time in the route in FIG. 9.

That is, it is assumed that traveling time from the home position to the place A is 10 minutes and it is also assumed that traveling time between the place A and the place B is 20 minutes, traveling time between the place B and the place C is 40 minutes, and traveling time between the place C and the place D is 10 minutes. In addition, it is also assumed that the estimated printing time for the place A is 10 minutes, the estimated printing time for the place B is 20 minutes, the estimated printing time for the place C is 30 minutes, and the estimated printing time for the place D is 40 minutes. In this case, when it is assumed that the image forming apparatus 18 travels in the clockwise direction, the wait time for the place A is 10 minutes, the wait time for the place B is 40 minutes, the wait time for the place C is 100 minutes, and the wait time for the place D is 140 minutes. Accordingly, the average wait time is 72.5 minutes.

On the other hand, in a case where the image forming apparatus 18 travels in the counterclockwise direction, the wait time for the place A is 10 minutes, the wait time for the place D is 50 minutes, the wait time for the place C is 100 minutes, and the wait time for the place B is 170 minutes. Accordingly, the average wait time is 82.5 minutes. Therefore, since the average wait time becomes shorter when the image forming apparatus 18 travels in the clockwise direction, the traveling route in the clockwise direction is selected.

Figure 13:
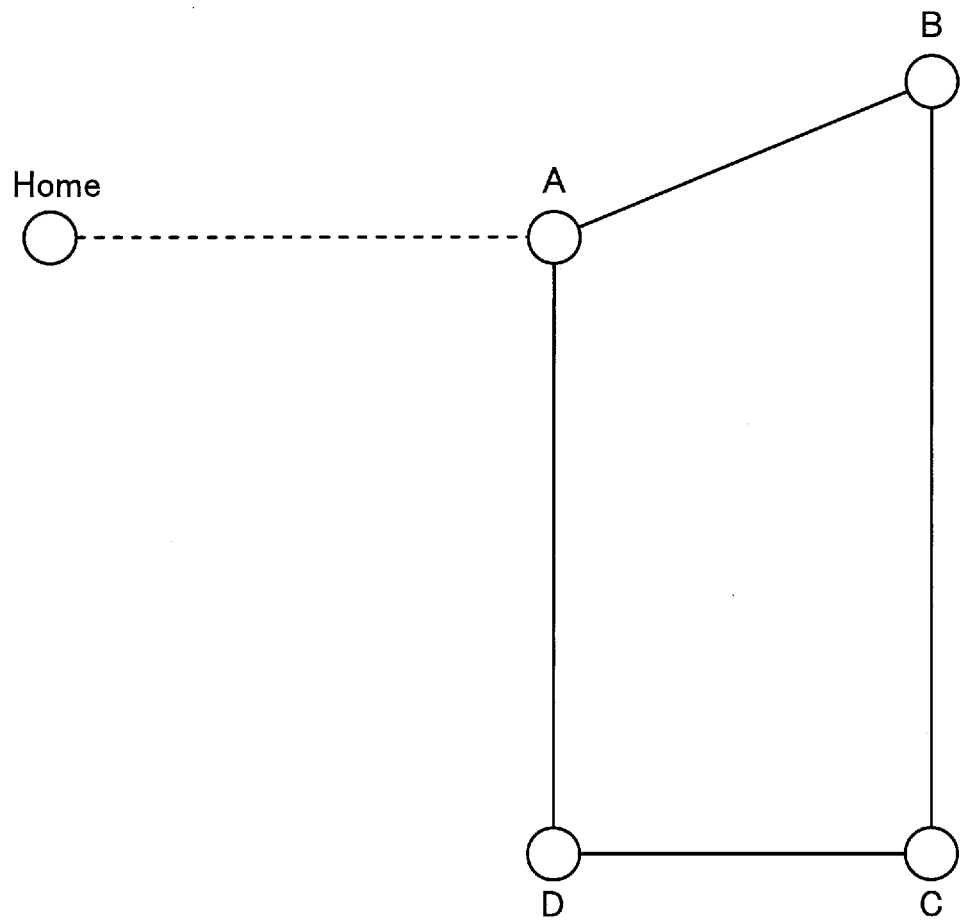
FIG. 13 is a route diagram illustrating a route in a case where traveling times between places for processing are extremely different.

FIG. 13 illustrates a case where traveling times of the image forming apparatus 18 are extremely different.

FIG. 14 is related to a case where each traveling time<< each printing time in the route in FIG. 13.

That is, it is assumed that traveling time from the home position to the place A is 1 minute and it is also assumed that traveling time between the place A and the place B is 2 minutes, traveling time between the place B and the place C is 10 minutes, traveling time between the place C and the place D is 1 minute, and traveling time between the place D and the place A are 4 minutes in a case where the image forming apparatus 18 travels in the clockwise direction. In addition, it is also assumed that the estimated printing time for the place A is 10 minutes, the estimated printing time for the place B is 20 minutes, the estimated printing time for the place C is 30 minutes, and the estimated printing time for the place D is 40 minutes. In this case, the wait time for the place A is 1 minute, the wait time for the place B is 13 minutes, the wait time for the place C is 43 minutes, and the wait time for the place D is 74 minutes. Accordingly, the average wait time is 32.8 minutes.

On the other hand, it is assumed that traveling time between the place A and the place D is 3 minutes, traveling time between the place D and the place C is 1 minute, and traveling time between the place C and the place B is 10 minutes in a case where the image forming apparatus 18 travels in the counterclockwise direction. The wait time for the place A is 1 minute, the wait time for the place D is 14 minutes, the wait time for the place C is 55 minutes, and the wait time for the place B is 95 minutes. Accordingly, the average wait time is 41.3 minutes. Therefore, since the average wait time becomes shorter when the image forming apparatus 18 travels in the clockwise direction, the traveling route in the clockwise direction is selected.

FIG. 15 is related to a case where each traveling time>> each printing time in the route in FIG. 13.

That is, it is assumed that traveling time from the home position to the place A is 10 minutes and it is also assumed that traveling time between the place A and the place B is 20 minutes, traveling time between the place B and the place C is 100 minutes, and traveling time between the place C and the place D is 10 minutes. In addition, it is also assumed that the estimated printing time for the place A is 1 minute, the estimated printing time for the place B is 2 minutes, the estimated printing time for the place C is 3 minutes, and the estimated printing time for the place D is 4 minutes. In this case, when it is assumed that the image forming apparatus 18 travels in the clockwise direction, the wait time for the place A is 10 minutes, the wait time for the place B is 31 minutes, the wait time for the place C is 133 minutes, and the wait time for the place D is 146 minutes. Accordingly, the average wait time is 80.0 minutes.

On the other hand, it is assumed that traveling time between the place A and the place D is 10 minutes, traveling time between the place D and the place C is 10 minutes, and traveling time between the place C and the place B is 100 minutes in a case where the image forming apparatus 18 travels in the counterclockwise direction. The wait time for the place A is 10 minutes, the wait time for the place D is 41 minutes, the wait time for the place C is 55 minutes, and the wait time for the place B is 158 minutes. Accordingly, the average wait time is 66.0 minutes. Therefore, since the average wait time becomes shorter when the image forming apparatus 18 travels in the counterclockwise direction, the traveling route in the counterclockwise direction is selected.

FIG. 16 is related to a case where each traveling time≈each printing time in the route in FIG. 13.

The traveling times in FIG. 16 are the same as the traveling times in FIG. 15. However, it is assumed that the estimated printing time for the place A is 10 minutes, the estimated printing time for the place B is 20 minutes, the estimated printing time for the place C is 30 minutes, and the estimated printing time for the place D is 40 minutes. In this case, when it is assumed that the image forming apparatus 18 travels in the clockwise direction, the wait time for the place A is 10 minutes, the wait time for the place B is 40 minutes, the wait time for the place C is 160 minutes, and the wait time for the place D is 200 minutes. Accordingly, the average wait time is 102.5 minutes.

On the other hand, in a case where the image forming apparatus 18 travels in the counterclockwise direction, the wait time for the place A is 10 minutes, the wait time for the place D is 50 minutes, the wait time for the place C is 100 minutes, and the wait time for the place B is 230 minutes. Accordingly, the average wait time is 97.5 minutes. Therefore, since the average wait time becomes shorter when the image forming apparatus 18 travels in the counterclockwise direction, the traveling route in the counterclockwise direction is selected.

In the exemplary embodiment, wait time for an Nth user is applied to the equation (1) when determining the traveling route. However, in this case, a user with a long estimated printing time or a user with long traveling time is given a low priority and the wait time of the user becomes long.

Therefore, as shown in the following equation (2), a user is ranked (special, normal, or the like) and the calculation is performed while multiplying a coefficient ($0.0 < Y_N \leq 1.0$) according to the result of the ranking.

Estimated wait time for a ranked $N$th user=wait time for $(N-1)$th user+$(Y_{N-1} \times (N-1))$th estimated printing time+traveling time from $(Y_{N-1} \times (N-1))$th user (2)

According to the equation (2), the estimated wait time for a ranked Nth user becomes short. Therefore, the image forming apparatus 18 travels to the ranked user first before traveling to other users.

In addition, the processing apparatus in the exemplary embodiment is the image forming apparatus. However, the invention can be applied to apparatuses for other processing, for example, a movie image reproduce processing apparatus, a cooking device that makes a beverage or cooking instantly, a device that assembles or disassembles a machine, or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A control device comprising:
at least one processor configured to act as:
   a receiving unit that receives a request for printing; and
   a control unit that, in a case where the receiving unit receives a plurality of requests for printing from a plurality of places, controls a traveling route of an image forming apparatus based on traveling time taken for the image forming apparatus to travel to each of the plurality of places and printing time taken for the image forming apparatus to finish the printing after arriving at each of the plurality of places.

2. The control device according to claim 1,
wherein the control unit controls the traveling route of the processing forming apparatus such that average wait time becomes shortest, the average wait time being an average of waiting time at each of the plurality of places.

3. The control device according to claim 1,
wherein the receiving unit further receives priorities of a plurality of requests for printing, and
the control unit controls the traveling route of the image forming apparatus further based on the priorities.

4. The control device according to claim 1,
wherein the control unit estimates the printing time based on a number of items of printed matter, a number of pages in an item of printed matter, a type of printing, or a past record.

5. A image forming apparatus system comprising:
an image forming apparatus that performs printing; and
a control device that controls the image forming apparatus,
wherein the control device comprises at least one processor configured to act as:
   a receiving unit that receives a request for printing; and
   a control unit that, in a case where the receiving unit receives a plurality of requests for printing from a plurality of places, controls a traveling route of the image forming apparatus based on traveling time taken for the image forming apparatus to travel to each of the plurality of places and printing time taken for the image forming apparatus to finish the printing after arriving at each of the plurality of places.

6. A non-transitory computer readable recording medium storing a program causing a computer to execute:
receiving a request for printing; and
controlling, in a case where a plurality of requests for printing are received from a plurality of places, a traveling route of an image forming apparatus based on traveling time taken for the image forming apparatus to travel to each of the plurality of places and printing time taken for the image forming apparatus to finish the printing after arriving at each of the plurality of places.

* * * * *